United States Patent [19]
Meinerding, Sr.

[11] Patent Number: 5,706,862
[45] Date of Patent: Jan. 13, 1998

[54] PIPE REPAIR DEVICE

[76] Inventor: Wesley C. Meinerding, Sr., 1019 Knollwood, NW., Canton, Ohio 44708

[21] Appl. No.: 741,651

[22] Filed: Oct. 31, 1996

[51] Int. Cl.$^6$ ............................................. F16L 55/168
[52] U.S. Cl. ........................................ 138/99; 138/98
[58] Field of Search ........................... 138/97, 98, 99; 24/279

[56] References Cited

U.S. PATENT DOCUMENTS

| | | | |
|---|---|---|---|
| 2,279,642 | 4/1942 | Schreiner | 138/99 |
| 2,586,640 | 2/1952 | Furman | 138/99 |
| 2,712,326 | 7/1955 | Yurdin | 138/99 |
| 4,155,574 | 5/1979 | Hulsey | 138/99 |
| 4,202,379 | 5/1980 | Vetter | 138/99 |
| 4,391,300 | 7/1983 | Saylor et al. | 138/99 |
| 5,002,094 | 3/1991 | Brovont | 138/99 |
| 5,027,862 | 7/1991 | Laybourn | 138/99 |
| 5,247,967 | 9/1993 | Bourque | 138/99 |
| 5,497,808 | 3/1996 | Schlund et al. | 138/99 |

FOREIGN PATENT DOCUMENTS

| | | | |
|---|---|---|---|
| 4314940 | 11/1994 | Germany | 138/99 |
| 0648581 | 1/1951 | United Kingdom | 138/99 |

Primary Examiner—David Scherbel
Assistant Examiner—James F. Hook
Attorney, Agent, or Firm—Renner, Kenner, Greive, Bobak, Taylor & Weber

[57] ABSTRACT

A pipe repair device (10) includes a slotted strap (18) having a first end (20) and a second end (22). The second end (22) of the strap (18) is connected to an adjusting mechanism (24) that is operable to engage the slots in the strap (18) to increase or decrease the diameter of the loop formed when the first end (20) of the strap (18) engages the adjusting mechanism (24). A sealing member (14) having a pair of spaced, substantially parallel slots (50) is slidably carried by the strap (18) through the engagement of the strap (18) with both slots (50). A body portion (52) of the sealing member (14) that is disposed between both slots (50) is disposed radially inward of the strap (18). A backing plate (60) is carried by the sealing member (14) between the sealing member (14) and the strap (18). The backing plate (60) has two tabs (64) that are inserted in the slots (50) causing the backing plate (60) to be retentively carried by the sealing member (14). The tabs (64) are separated from the main body (62) of the plate (60) by pairs of aligned notches (66). The pairs of aligned notches (66) are connected to the main body (62) by neck portions (68) that are slightly less wide than the length of the slots (50). The engagement of the tabs (64) with the slots (50) allows the sealing member (14) and the backing plate (60) to be rotated as a unit about the circumference of the loop to be positioned over a fault in a pipe (12).

17 Claims, 2 Drawing Sheets

PIPE REPAIR DEVICE

TECHNICAL FIELD

The present invention relates generally to a device for repairing holes or cracks in pipes. More particularly, the present invention relates to a device for repairing pipes that includes a sealing element that is adjustably connected to a pipe clamp. Specifically, the present invention relates to a device for repairing holes in pipes, including an adjustable pipe clamp that passes through a pair of slots in a sealing member, such that the sealing member is adjustably supported by the clamp.

BACKGROUND ART

Numerous pipe repair devices have been employed in the art. These devices typically include a clamp that fits around the pipe and a sealing member that is held against the pipe by the clamp. One such configuration is disclosed by U.S. Pat. No. 2,279,642 to Schreiner. Schreiner discloses a pipe repair clamp having an adjustable band that may be adjusted by a stud that threadably engages a pair of lugs that are connected to the band. A sealing member is attached to a rib-backed backing plate by a suitable adhesive.

Another leak-sealing device is disclosed in U.S. Pat. No. 2,586,640 to Furman. Furman discloses a spring clamp that may be adjustably mounted on a pipe. A pin is carried by a carrier that is slidably mounted on a clamp. The pin is inserted into the hole in the pipe where the leak occurs. An elastomeric washer surrounds a portion of the pin and cooperates with the pin to seal the hole.

A pipe patching clamp is disclosed by U.S. Pat. No. 4,391,300 to Saylor, et al. The clamp includes a molded plastic strap having two sets of circumferentially-spaced grooves in the inner surface therein. Each set of grooves is parallel to the longitudinal axis of the strap and is configured to accept sealing strips. The sealing strips are positioned against the area of a pipe having a leak, and the strap is tightened around the pipe.

U.S. Pat. No. 5,247,967 to Borque discloses a pipe repair apparatus including a sealing member that is attached to a rigid plate by an adhesive. The rigid plate is slidingly supported on a slotted strap by the engagement of the strap with a slot on the back of the rigid plate. A worm gear is attached to the strap and is operable to adjust the diameter of the strap.

Problems with these and other devices are often experienced in that pipe defects frequently occur in areas that are partially inaccessable or hard to reach. Thus, a pipe repair apparatus that may be readily installed with one hand is preferred. It is also generally desirable to manufacture such devices which operate without adhesives to avoid the time lapse required to cure or dry the adhesive. It is also generally desirable to manufacture the devices from standard parts or adaptations thereof that require only minimal initial start-up expenses.

DISCLOSURE OF THE INVENTION

In light of the foregoing, it is an object of the present invention to provide a device for repairing pipe wherein the sealing member of the device is adjustably supported by the strap of the clamp.

Another object of the invention is to provide a pipe repair device that may be installed in tight or limited working areas with one hand.

Yet another object of the invention is to provide a pipe repair device which may be readily moved axially of a pipe for positioning in overlying relation to a fault in the pipe.

A further object of the present invention is to provide a pipe repair device having a sealing member that is slidably adjustable around the pipe by moving the clamp circumferentially of the pipe or moving the sealing member relative to the strap of the clamp about the pipe.

Still another object of the present invention is to provide a pipe repair device, as described above, wherein the sealing member is supported on the device without an adhesive.

Another object of the present invention is to provide a pipe repair device, as described above, having a backing plate supported by and behind the sealing member and positioned between the sealing member and the strap.

In general, the present invention contemplates a strap, a sealing member carried by the strap, a backing plate carried by the sealing member, and an adjusting mechanism.

PREFERRED EMBODIMENT FOR CARRYING OUT THE INVENTION

Figure 1:
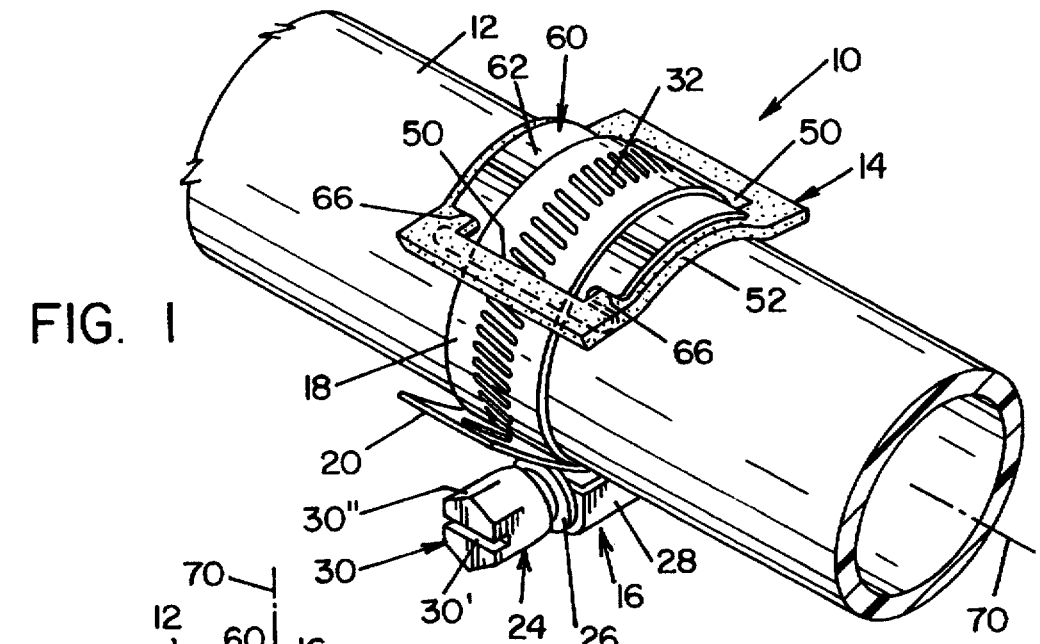
FIG. 1 is a perspective view of a pipe repair device according to the concepts of the present invention depicted in operative relation to a fault in the pipe.
Figure 2:
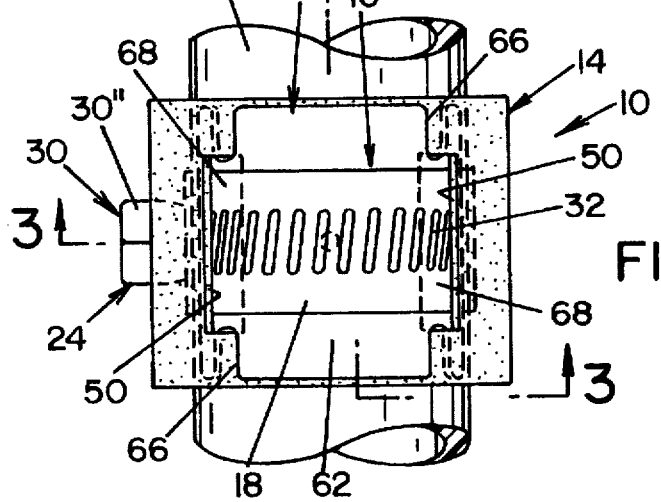
FIG. 2 is a plan view of the pipe repair device in FIG. 1 showing details of the interrelationship between the components of the pipe repair device when operatively assembled on a pipe.
Figure 3:
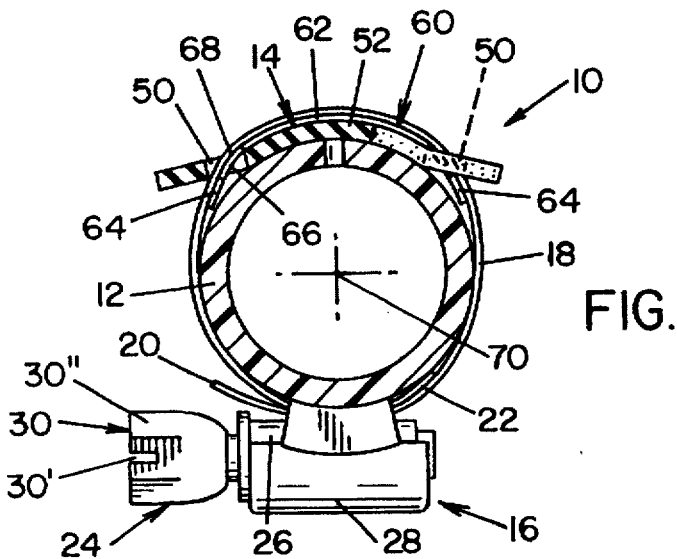
FIG. 3 is a view partially in section taken substantially along line 3—3 of FIG. 2 showing the positioning of the pipe repair device components in relation to an exemplary fault in the pipe.
Figure 4:
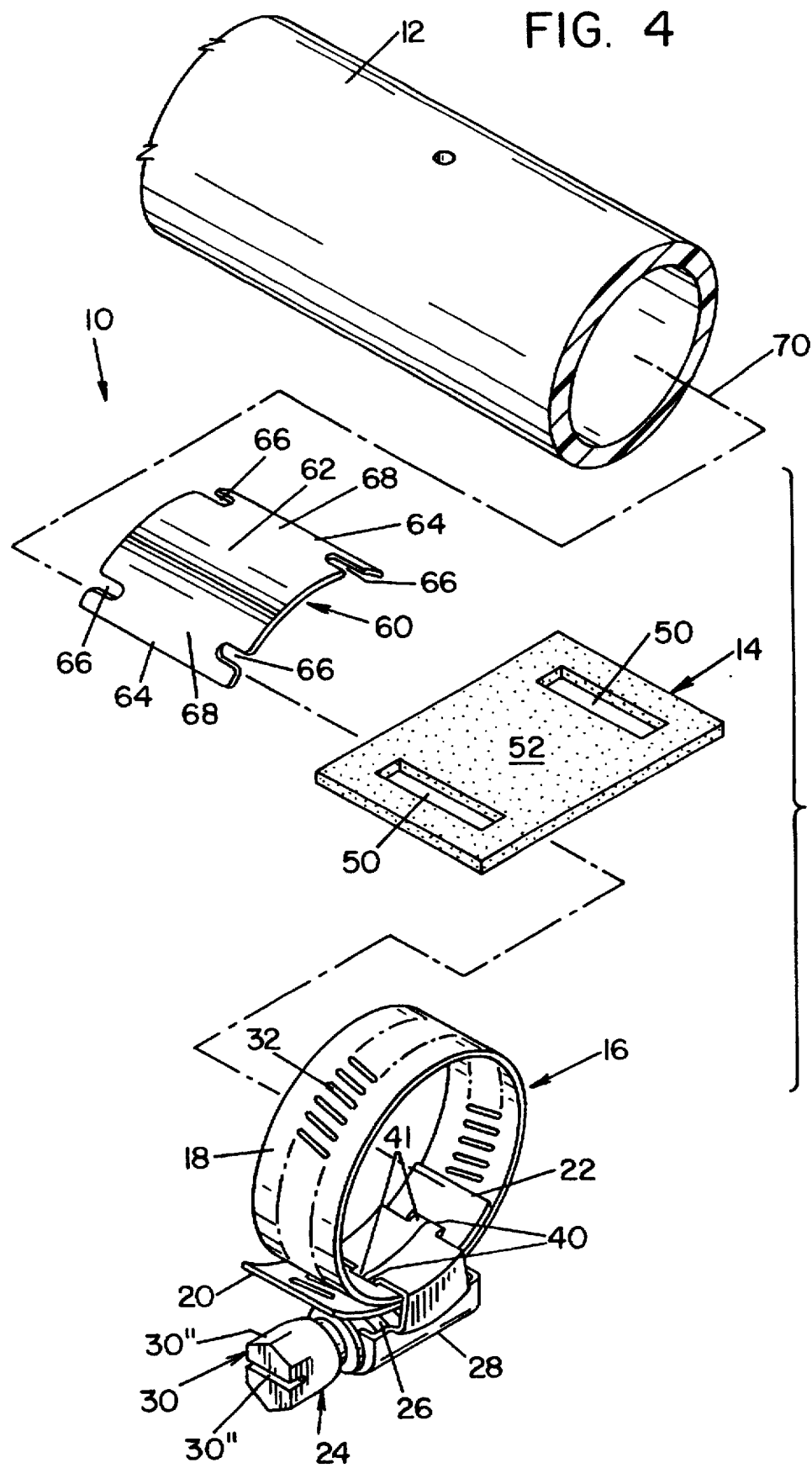
FIG. 4 is an exploded view of the pipe repair device according to the present invention, showing details of the individual components of the pipe repair device.

A pipe repair device according to the concepts of the present invention is depicted in FIG. 1 and is indicated generally by the numeral 10. The pipe repair device 10 effects repair of a hole, crack, or other fault in a pipe 12 by holding a sealing member, generally indicated by the numeral 14, against the fault. The pipe repair device 10 includes a pipe clamp, generally indicated by the numeral 16, having a slotted strap 18 with a first end 20 and a second end 22. An adjusting mechanism, generally indicated by the numeral 24, is attached to the second end 22 of the strap 18 and includes a worm gear 26 rotatably disposed in a housing 28. A screw head 30 with a slot 30' and flats 30" is formed on the worm gear 26 so that a common screwdriver or wrench may be used to turn the worm gear 26. The second end 22 of strap 18 has a pair of slots 40 which receive ears 41 projecting from adjusting mechanism 24 to affix the second end 22 thereto. The first end 20 of the strap 18 passes through the housing 28 such that the worm gear 26 engages a series of slots 32 in the strap 18 to form a loop. As the worm gear 26 is rotated, the diameter of the loop is increased or decreased, depending upon the direction of rotation. Thus, it may be seen that the pipe repair device 10 of the present invention may be either slipped over the end of a pipe 12 or, if necessary, may be wrapped around the outer circumference of a pipe 12.

The sealing member 14 is slidably supported axially and circumferentially of pipe 12 by the strap 18 and has a pair of spaced, substantially parallel slots 50 and a central body portion 52 disposed between the slots 50. The sealing member 14 is preferably fabricated from an elastomeric material. The sealing member 14 is mounted on the pipe clamp 16 such that the strap 18 passes through both slots 50 to position the central body portion 52 radially inward of the loop formed by the strap 18. Such mounting allows the sealing member 14 to be slidably carried by the strap 18 without the use of adhesives or other connectors. As such, the sealing member 14 may be moved circumferentially about the loop formed by the strap 18, thus allowing the sealing member 14 to be accurately positioned relative to the periphery of a pipe 12, irrespective of whether the pipe clamp 16 is moved. This permits circumferentially adjusting the position of sealing member 14 while maintain screw head 30 in an accessible location.

A backing plate, generally indicated by the numeral 60, having a body portion 62 and two tabs 64 extending therefrom is disposed between the sealing member 14 and the strap 18. A pair of aligned notches 66 extending inwardly from the edges of backing plate 60 separate each tab 64 from the body portion 62. The notches 66 are of a length such that a neck portion 68 formed between each pair of aligned notches 66 is preferably slightly shorter than the length of the slots 50. Such a configuration allows the tabs 64 to be readily inserted into the slots 50, thus causing the sealing member 14 to retentively carry the backing plate 60. As such, the backing plate 60 is disposed between the sealing member 14 and the strap 18. The engagement of the tabs 64 with the slots 50 causes the backing plate 60 to be carried by the sealing member 14 such that both may be rotated as a unit around the circumference of the loop formed by strap 18 for positioning overlying a fault in a pipe 12.

The pipe 12 has a longitudinal axis indicated by the numeral 70 in FIG. 1. Each slot 50 is disposed in the sealing member 14 such that the longitudinal axis 72 of each slot is substantially parallel to the longitudinal axis 70 of the pipe 12. Both the sealing member 14 and the backing plate 60 preferably have widths that are substantially equal. However, it is preferable that the width of the sealing member 14 be slightly larger than the width of the backing plate 60 and the width of both the sealing member 14 and backing plate 60 are preferably substantially greater than the width of the strap 18 in order to cover cracks extending a distance axially of the pipe 12.

The pipe repair device 10 is operated by positioning the sealing member 14 and the backing plate 60 on the strap 18. The strap 18 is then wrapped around a pipe 12, and the first end 20 is inserted into the adjusting mechanism 24 such that the slots 32 of the first end 20 engage the worm gear 26. The user adjusts strap 18 to form a loop slightly larger than the pipe 12, slidingly positions the sealing member 14 over the fault, and tightens the loop with a suitable tool. The positioning of the sealing member 14 may be readily accomplished with one hand because the sealing member 14 and backing plate 60 move as a unit about the strap 18. Further, the sealing member 14 or backing plate 60 may be readily replaced if damaged, and different sealing members 14 made of different elastomers may be substituted for compatability with pipes 14 carrying different fluids.

Thus, it should be evident that the pipe repair device 10 disclosed herein fulfills the various objects of the present invention set forth above and otherwise constitutes an advantageous contribution to the art. As will be apparent to persons skilled in the art, modifications can be made to the preferred embodiment of the present invention disclosed herein without departing from the spirit of the invention, the scope of the invention being limited solely by the scope of the attached claims.

I claim:

1. A pipe repair device for repairing a leak in a pipe comprising, a strap, a sealing member slidingly carried by said strap, passing through said sealing member to support it and a backing plate carried by said sealing member and interposed between said strap and said sealing member.

2. A pipe repair device according to claim 1, wherein said sealing member has a pair of slots, said strap passing through both of said slots.

3. A pipe repair device according to claim 2, wherein said slots are spaced and substantially parallel.

4. A pipe repair device according to claim 2, wherein said backing plate has a pair of tabs, said backing plate being carried by said sealing member through the engagement of said tabs with said slots.

5. A pipe repair device according to claim 1, wherein said strap is wrapped about the pipe to position a substantial portion of said sealing member between the pipe and said strap.

6. A pipe repair device according to claim 5, wherein a substantial portion of said backing plate is disposed between said sealing member and said strap.

7. A pipe repair device comprising, a strap; a backing plate having two tabs and a body portion, each of said tabs being separated from said body portion by a neck; a sealing member having two spaced, substantially parallel slots; said sealing member having a central body portion disposed between said slots; said strap passing through both of said slots such that said central body portion is disposed radially inward of said strap when said strap is wrapped around the pipe; each tab of said backing plate engaging one of said slots in said sealing member such that said body portion of said backing plate is disposed between said strap and said sealing member.

8. A pipe repair device according to claim 7, wherein each of said slots in said sealing member has a length and each of said necks has a width, said width of said necks being slightly less than said length of said slots.

9. A pipe repair device according to claim 7, wherein the pipe has a longitudinal axis and each of said slots in said sealing member has a longitudinal axis, said longitudinal axis of each of said slots in said sealing member being substantially parallel to said longitudinal axis of the pipe.

10. A pipe repair device according to claim 7 further comprising, an adjusting mechanism attached to one end of said strap, said adjusting mechanism adapted to receive an other end of said strap to form a loop and to selectively adjust the diameter of said loop.

11. A pipe repair device according to claim 10, wherein said adjusting mechanism comprises a worm gear rotatably mounted in a housing, said strap having a plurality of slots sequentially engaging said worm gear to adjust the diameter of said loop.

12. A pipe repair device according to claim 7, wherein said sealing member and said backing plate are circumferentially adjustable about said strap.

13. A pipe repair device, comprising an adjustable strap having a first end and a second end, said strap further having a plurality of slots disposed therein; an adjusting connector disposed on said second end of said strap and adapted to accept said first end of said strap to form a loop for encompassing a pipe within the range set by said plurality of slots; a rotating worm gear fastener attached to said adjusting connector, said rotating worm gear fastener engaging said slots in said strap so that when said rotating worm gear fastener is rotated, the loop varies in diameter so as to adjustably encompass various diameter pipes; a backing plate; and a sealing member slidably disposed on said strap and carrying said backing plate, said strap passing through said member.

14. A pipe repair device according to claim 13, wherein said backing plate has a width and a length, said sealing member also having a width and a length, said width of said backing plate being substantially equal to said width of said sealing member.

15. A pipe repair device for use with a pipe clamp having a strap, the pipe repair device comprising a sealing member having two spaced, substantially parallel slots; and a backing plate having two tabs, each of said tabs engaging a slot in said sealing member to connect said backing plate to said sealing member.

16. A pipe repair device according to claim 15, wherein said sealing member has a central body portion, said central body portion being disposed radially inward of said strap when the strap is passed through said slots.

17. A pipe repair device according to claim 16, wherein said backing plate has a body portion, said body portion of said backing plate being disposed between the strap and said central body portion of said sealing member when the strap is passed through said slots.

* * * * *

UNITED STATES PATENT AND TRADEMARK OFFICE
CERTIFICATE OF CORRECTION

PATENT NO. : 5,706,862
DATED : January 13, 1998
INVENTOR(S) : Wesley C. Meinerding, Sr.

It is certified that error appears in the above-identified patent and that said Letters Patent is hereby corrected as shown below:

Column 4, line 1, "said strap, passing" should read --said strap, said strap passing--.

Column 4, line 2, "it and" should read --it, and--.

Column 4, line 67, "said member." should read --said sealing member.--.

Signed and Sealed this

Nineteenth Day of May, 1998

Attest:

BRUCE LEHMAN

*Attesting Officer*    *Commissioner of Patents and Trademarks*